G. F. KRIEGER.
TOOL HOLDER.
APPLICATION FILED OCT. 19, 1907.
911,999.
Patented Feb. 9, 1909.
2 SHEETS—SHEET 2.
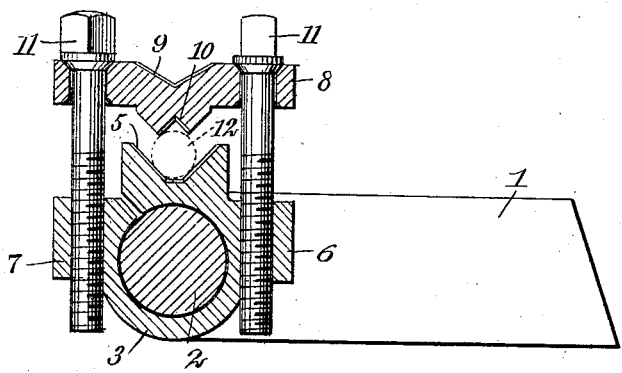
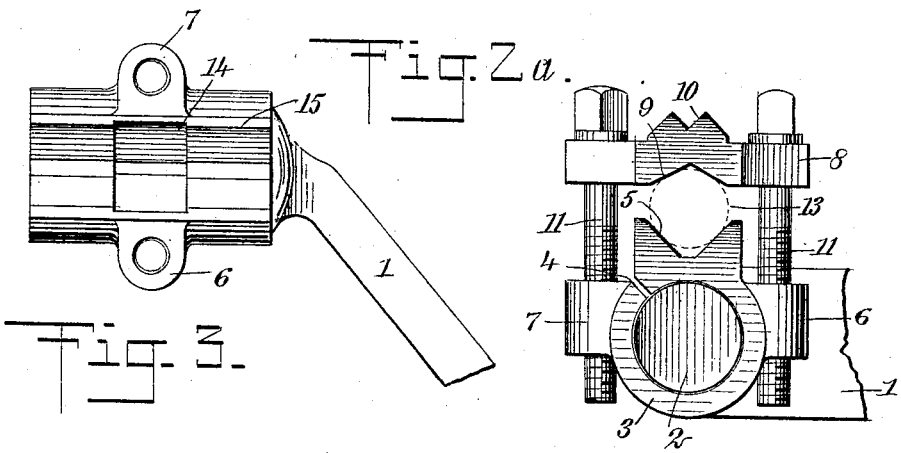
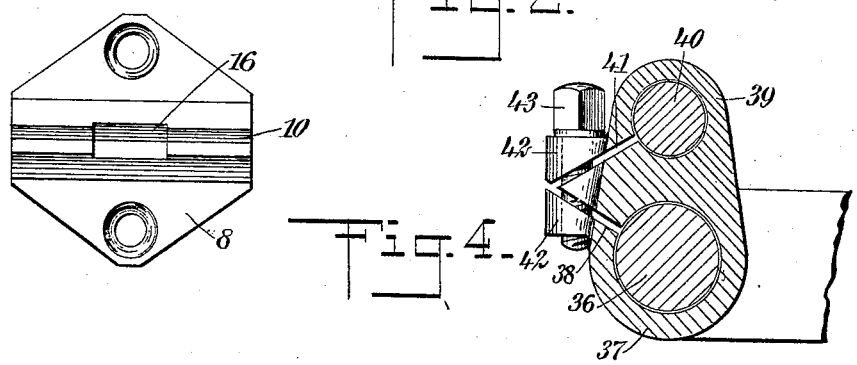
WITNESSES
Ben. Joffé
F. D. Ammen
INVENTOR
George F. Krieger
BY Munn & Co.
ATTORNEYS

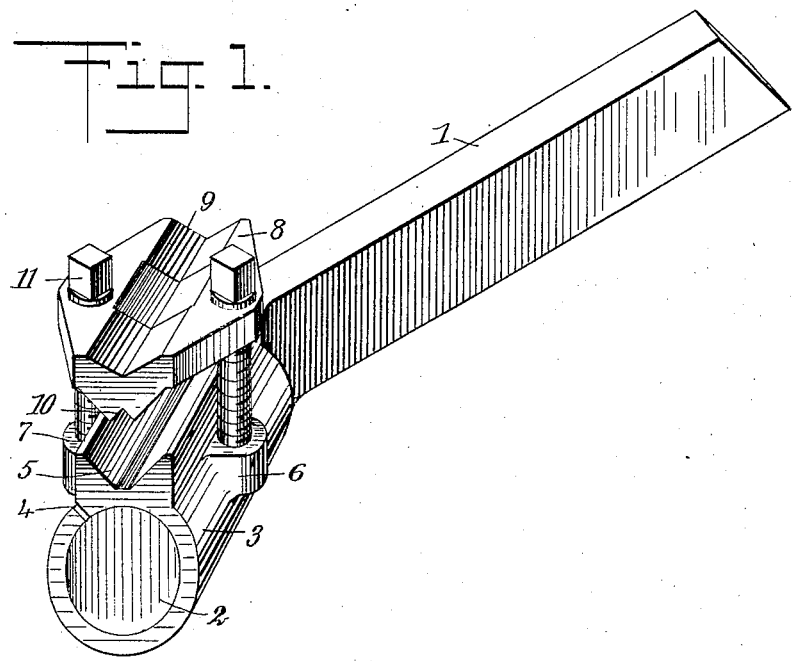

UNITED STATES PATENT OFFICE.

GEORGE F. KRIEGER, OF GRAND RAPIDS, WISCONSIN.

TOOL-HOLDER.

No. 911,999.　　　　Specification of Letters Patent.　　　　Patented Feb. 9, 1909.

Application filed October 19, 1907. Serial No. 398,169.

*To all whom it may concern:*

Be it known that I, GEORGE F. KRIEGER, a citizen of the United States, and a resident of Grand Rapids, in the county of Wood and State of Wisconsin, have invented a new and Improved Tool-Holder, of which the following is a full, clear, and exact description.

This invention relates to tool holders such as used for holding cutting tools in machine operations such as boring, turning or planing.

The object of the invention is to provide a tool holder with an adjustable member which will enable the tool to be clamped adjustably upon the tool holder in any desired position, the construction being such that the tightening of the clamping means for holding the tool upon the adjustable member also operates to secure the adjustable member upon the body of the tool holder.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a perspective showing a tool holder constructed according to my invention. Fig. 2 is a vertical section through the tool holder at the tool, and passing in a plane at right angles to the axis of the tool; this view shows the tool holder as used to secure a tool of small size; Fig. 2ª is an elevation of the tool holder in a plane parallel with the plane of the section Fig. 2, but showing the tool holder as used in holding a tool of large size; Fig. 2ᵇ is a view of a form showing a simpler construction than that shown in Fig. 2ª; Fig. 3 is a plan of the tool holder; Fig. 4 is a bottom plan of the cap which constitutes a part of the tool holder.

Referring more particularly to the parts, and especially to Figs. 1 to 4, 1 represents the body or arm of a tool holder. The extremity of this arm is bent slightly to one side, as illustrated most clearly in Fig. 3, and is formed with a rounded wrist 2 or stub end. Upon this wrist I apply a sleeve 3 which is provided with a longitudinal slit or cut 4 which extends throughout the entire length thereof, as shown. On the upper side of the sleeve near this slit 4 a longitudinally extending groove 5 is formed, the said groove constituting a tool seat. The material is reinforced at this point as shown, and the groove is of "V" form having a flat bottom, as indicated most clearly in Figs. 1, 2 and 2ª. On each side and preferably near its middle point, the sleeve 3 is provided with lugs 6 and 7. The lug 7 is disposed just below the slit 4, so that the slit lies between this lug and the tool seat or groove 5.

Above the tool seat, I provide a reversible cap 8 which is provided on one side with a shallow or large groove 9 very similar in form to the groove or tool seat 5. On its other side, that is, on its under side as shown in Fig. 1, the cap is provided with a longitudinal groove 10, which is of small dimensions. This cap is provided with oppositely disposed openings which aline with the lugs 6 and 7, and through these openings clamping bolts 11 extend downwardly, the lower portions of said bolts being threaded in the lugs, as indicated in Fig. 2. When the cap is applied as shown in Fig. 2, that is, with the small groove 10 downwardly, the tool holder is adapted to hold a tool or tool bar 12 indicated by the dotted lines, and this tool bar may be of small dimensions or diameter, as indicated. In the reverse position, as indicated in Fig. 2ª, the cap affords means for holding a tool or tool bar 13, of larger dimension or diameter. It will be evident that when the bolts 11 are screwed up in order to clamp the tool upon the tool seat, the sleeve will be at the same time clamped upon the wrist 2. In this way one operation suffices to secure the tool upon the sleeve and the sleeve upon the wrist. In order to increase the holding power of the cap and seat, the middle portion of the seat is provided with a recess 14, as illustrated in Fig. 3. In this way the seat presents clamping jaws or faces 15 disposed at the ends of the sleeve. Likewise, the grooves of the cap are provided with central recesses 16, as illustrated in Fig. 4.

In the form shown in Fig. 2ᵇ I provide a main sleeve 37 mounted on the wrist 36 and formed with a longitudinal slit or split 38 inclined as shown. A smaller sleeve 39 is formed integral with the main sleeve and receives the tool 40 as indicated. This sleeve is formed with a slit or split 41, inclined oppositely to the slit 38 but on the same side. These slits 38 and 41 extend through clamping lugs 42 formed at the side of the holder and provided with clamping bolts 43 for bringing the parts together. With this construction it is evident that when the bolts are tightened up they will clamp the wrist and the tool simultaneously.

Having thus described my invention, I claim as new and desire to secure by Letters Patent:

1. A tool holder having an arm with a wrist formed thereupon, a sleeve mounted on said wrist and having clamping devices disposed on opposite sides of said wrist, said sleeve having a slit in the wall thereof disposed between said clamping devices and presenting a seat for the tool near said slit, and a removable cap secured by said clamping devices and adapted to force the tool downwardly upon said seat, the pressure on said tool seat affording means for clamping said sleeve upon said wrist.

2. A tool holder having an arm with a wrist formed thereupon, a sleeve rotatably mounted on said wrist, having clamping lugs on the sides thereof, and a tool seat between said lugs, said sleeve having a slit extending longitudinally thereof between said seat and one of said lugs, a cap coöperating with said seat to hold a tool thereupon, and clamping bolts securing said cap and mounted in said lugs.

In testimony whereof I have signed my name to this specification in the presence of two subscribing witnesses.

GEORGE F. KRIEGER.

Witnesses:
WILLIAM A. DRUMB,
A. B. SUTOR.